Patented Mar. 13, 1923.

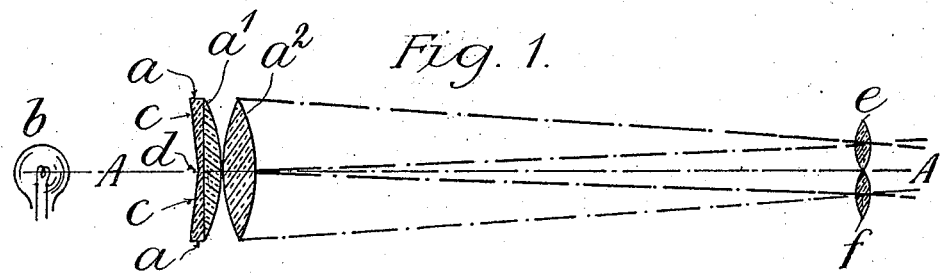
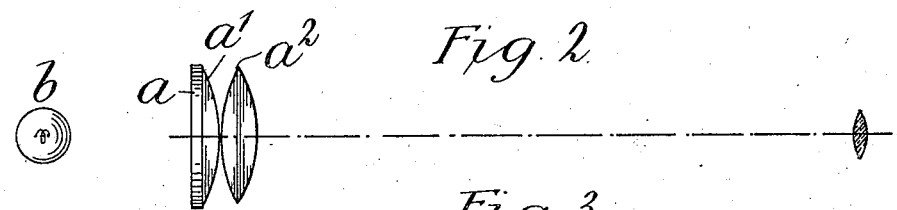
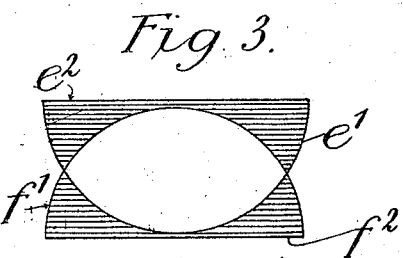
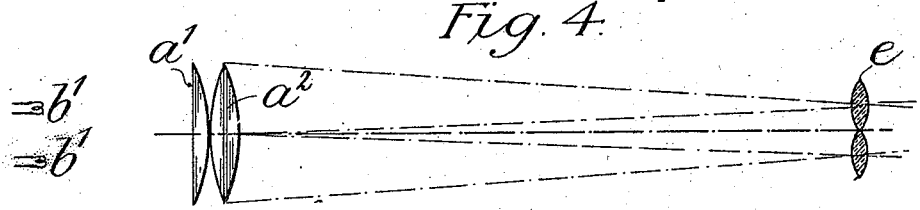

1,448,439

UNITED STATES PATENT OFFICE.

HOWARD GRUBB, OF DUBLIN, IRELAND.

VEHICLE HEADLIGHT AND THE LIKE.

Application filed September 11, 1919. Serial No. 323,188.

*To all whom it may concern:*

Be it known that I, HOWARD GRUBB, a subject of the King of Great Britain and Ireland, residing at Dublin, Ireland, have invented Improvements in or Relating to Vehicle Headlights and the like, of which the following is a specification.

This invention relates to lamps, more particularly for use as headlights on motor cars.

As is universally recognized, the drawback to all existing headlights, in spite of the variety of forms in vogue and the improvements suggested from time to time, is the objectionable glare experienced on approach. Whatever the defect in each particular case may be attributed to, the general failure is due to the inability to produce a sharp line of demarcation between darkness and light. That this must be so in any arrangement embodying a reflector, or a lens condenser, intended to render the emerging rays of light obtained from the source, whether it be electricity or gas, approximately parallel, will be evident when it is remembered that the difficulties include spherical aberration of lenses, imperfection of mirrors and the fact that the source of light is never an actual point.

Now the object of the present invention is to provide a lamp in which a sharp line of demarcation between darkness and light is obtainable in a simple and effective manner and which is therefore particularly suitable for use as a headlight on a motor car, but is also applicable for other uses, as for example as a signal light, a harbour light, a navigating light, a leading light and so forth.

For this purpose, in a lamp according to the present invention, there are used in conjunction with means for producing light, a single condensing system whereon rays of light from the source of light can fall and from which rays of light will proceed and adapted to produce a plurality of distinct converging beams of light proceeding simultaneously in a forward direction, and a plurality of objectives common to the single condensing system and each placed in or near the plane of greatest condensation of the respective converging beam of light with which it is to deal and of such focus that it will form an image, having a sharp contour, on a distant object of the brilliantly illuminated part of the condenser system from which its corresponding beam of light is derived the several images forming a region of light of different intensities at different parts thereof and having a sharp upper or outer edge.

Lamps embodying the invention can be variously constructed.

But in order that the said invention may be better understood, examples will now be described with reference to the accompanying drawings from which others will be readily ascertainable.

In the said drawings, Fig. 1 is a diagram of one arrangement, the optical elements being shown in vertical section. Fig. 2 is a horizontal section of part of Fig. 1 the section being taken on the line A A. Fig. 3 is a diagram of the image resulting from the arrangement shown in Fig. 1. Fig. 4 is a diagram of a modification.

In the arrangement according to Figs. 1 and 2, a single condensing system $a$, $a^1$, $a^2$ is employed, the portion $a$ of which adjacent to and constantly exposed to the source $b$, of light, comprises two flat surfaces $c$ diverging towards the source of light from a horizontal diametrical line $d$ so that the two parts of the portion $a$ act after the manner of prisms and split the direct rays of light passing through them direct from the source of light $b$ into two distinct pencils of light which pass through the adjacent upper and lower portions respectively of the plano-convex lens $a^1$ and the double convex lens $a^2$ of the condensing system. The two pencils of light brilliantly illuminate the two portions of the condensing system from which they emerge, in a forward direction, as two converging beams of light, each beam being separately convergent. Two smaller objectives shown as lenses $e$ and $f$ are disposed, one above the other, in front of the condensing system and in or near the plane of condensation of the respective converging beams of light. The function of the upper one $e$ is to render the edges of an inverted semi-circular image corresponding to the upper half of the illuminated condensing system, sharp when projected on the roadway, or a vehicle, at say a distance of one hundred feet ahead. Such image is indicated at $e^1$ in Fig. 3. The lower lens objective $f$, in a similar way, produces an inverted semi-circular image $f^1$ corresponding to the lower half of the condensing system. The whole arrangement is such that the images overlap, the overlapping portions shown as left clear in Fig. 3, being roughly of twice the brilliancy of the non-overlapping portions which are shown shaded. The upper and lower edges $e^2$ and $f^2$ of the resultant image, corresponding to the straight horizontal line $d$ between the two prism portions $a$ of the condenser, are straight or substantially straight lines. If the condensing system $a$, $a'$, $a^2$ instead of being circular, were made rectangular, to coincide with the prismatic rear surfaces $c$ referred to, two images would be obtainable that could be completely superposed.

In the modification shown in Fig. 4, in lieu of employing prismatic or inclined surfaces in association with the condenser, the lamp might be provided, if electric, with two filaments $b^1$ suitably spaced apart so as to obtain by the aid of the condensing system $a'$ $a^2$, two distinct pencils of light each of which has its own lens objective $e$ or $f$ to form the image as already referred to.

As hereinbefore indicated, lamps embodying the invention can be variously modified. Thus, instead of using separate pieces $a$ $a'$ of glass, a single piece of glass having plane inclined faces $c$ extending outward and backward from a line $d$ and a convex front surface, could of course be used.

What I claim is:—

1. A lamp as herein set forth, comprising means for producing a source of light, a single condensing system arranged in front of the light producing means and adapted to produce a plurality of beams of light proceeding simultaneously in a forward direction, means to converge each beam separately, and a plurality of objectives each placed in or near the plane of greatest condensation of the respective converging beam of light with which it is to deal and made of such focus that it will form an image having a sharp contour on a distant object of the brilliantly illuminated part of the condenser system from which its corresponding beam of light is derived, the images being more or less superposed.

2. In a lamp as herein set forth, means for producing a source of light, a condensing system illuminated by rays of light from said source of light and from which rays of light will proceed in a forward converging direction, means adapted to divide the rays into a plurality of beams of light rays proceeding simultaneously in a forward direction and a plurality of objectives arranged in the paths of the said beams and each adapted to form an image having a sharp contour on a distant object of the brilliantly illuminated part of the condensing system from which its corresponding beam of light is derived, the several images being more or less superposed and one of them having a substantially straight edge.

3. In a lamp as herein set forth, means for producing a source of light, a single condensing system arranged in front of the light producing means and adapted to produce two beams of light proceeding simultaneously in a forward direction, means to converge each beam separately; each beam being of plano-convex shape in cross section, and two objectives each of such focus and so arranged that it will form an image having a sharp contour on a distant object of the brilliantly illuminated part of the condensing system from which its corresponding beam of light is derived the images being more or less superposed and each of them being of plano-convex shape with the plane portion horizontal.

4. A lamp as herein set forth, comprising means for producing a source of light, a condensing system arranged in front of the light producing means and embodying outwardly and rearwardly inclined faces adapted to split or divide the light rays passing through the condenser system into separate beams of light, proceeding simultaneously in a forward direction, and means to converge each beam separately, a plurality of objectives each placed in or near the plane of greatest condensation of the respective converging beam of light with which it is to deal and made of such focus that it will form an image having a sharp contour on a distant object of the brilliantly illuminated part of the condenser system from which its corresponding beam of light is derived, the images being more or less superposed.

5. A lamp, comprising means for producing a source of light, a condensing system from which rays of light received from said source will be caused to converge in a forward direction, means adapted to divide the rays of light horizontally into a plurality of superposed beams, the rays comprising each beam converging in a forward direction and optical means whereby the separate beams of light are caused to produce on a distant object, a plurality of images of the brilliantly illuminated parts of the condensing system from which said beams are derived, said images forming a region of light of different intensities at different parts thereof and having a sharp upper or outer edge.

6. A lamp, comprising means for producing a source of light, a condensing system adapted to collect rays of light from said source of light and cause them to converge in a forward direction, means arranged in the path of the rays proceeding from said source and having transversely arranged edges adapted to divide the rays of light into beams, each having, as seen in cross section, a contour embodying a substantially straight line, and a plurality of objectives arranged in the path of said beams and of such focus as to form on a distant object a plurality of images having sharp contours of the brilliantly illuminated parts of the condensing system from which said beams are derived, said images being more or less superposed so as to form regions of light of different intensity adjacent to each other and the total beam of reflected light forming the said sharply contoured superposed images having a substantially straight upper or outer edge.

7. A lamp, comprising means for producing a source of light, a condensing system through which rays of light from said source will pass, refractive devices arranged in the path of said rays and having edges extending transversely across the path of said rays and adapted to divide the rays into superposed beams, and optical means in front of said condensing system and refractive means, adapted to produce on a distant object, images of the brilliantly illuminated parts of the condensing system from which said beams are derived, said images being more or less superposed so as to produce adjacent regions of light of different intensities, the total beam of reflected light forming the said sharply contoured superposed images having a substantially straight upper or outer edge.

8. A lamp, comprising means for producing a source of light, a condensing system through which rays of light from said source can pass, prisms arranged in the path of the rays of light so as to divide said rays into superposed beams said prisms having their thinner ends terminating in substantially straight edges arranged horizontally towards the axis of the condensing system and their thicker ends remote from said axis, and objectives arranged in the path of the said beams and adapted to produce on a distant object images of the brilliantly illuminated parts of the condensing system from which said beams are derived, such images being superposed to produce adjacent regions of light of different intensities, the total beam of reflected light forming the said sharply contoured superposed images having a substantially straight upper or outer edge.

9. In a lamp as herein set forth, means for producing a source of light, a condensing system comprising a front double convex lens, a rear plano-convex lens and two prisms each having its rear plane surface arranged at an acute angle to the axis of the condenser system, and two objectives arranged in front of the condenser system and adapted to invert and more or less superpose the two images of the illuminated portions of the condensing system on a distant object.

Signed at Dublin, Ireland, this 22nd day of August, 1919.

HOWARD GRUBB.